(12) United States Patent
Plavetich et al.

(10) Patent No.: US 7,222,909 B1
(45) Date of Patent: May 29, 2007

(54) DETACHABLE WINDSHIELD

(75) Inventors: Richard Plavetich, Laguna Beach, CA (US); John Cupit, Olivehain, CA (US)

(73) Assignee: Nissan Design America, Inc., San Diego, CA (US)

( * ) Notice: Subject to any disclaimer, the term of this patent is extended or adjusted under 35 U.S.C. 154(b) by 0 days.

(21) Appl. No.: 11/317,662

(22) Filed: Dec. 23, 2005

(51) Int. Cl.
*B60J 1/02* (2006.01)
(52) U.S. Cl. ................... 296/96.21; 296/78.1
(58) Field of Classification Search ............ 296/96.21, 296/84.1, 96.22, 78.1
See application file for complete search history.

(56) References Cited

U.S. PATENT DOCUMENTS

| | | | | | |
|---|---|---|---|---|---|
| 4,087,110 | A | * | 5/1978 | Vetter | 296/78.1 |
| 4,632,448 | A | * | 12/1986 | Yagasaki et al. | 296/96.21 |
| 4,671,563 | A | * | 6/1987 | Shakespear | 296/181.1 |
| 4,966,408 | A | * | 10/1990 | Yura | 296/181.5 |
| 5,042,870 | A | * | 8/1991 | Yura | 296/181.5 |
| 5,110,174 | A | * | 5/1992 | Andree | 296/96.21 |
| 5,209,542 | A | * | 5/1993 | Yoshizawa | 296/96.12 |
| 5,685,388 | A | * | 11/1997 | Bothwell et al. | 296/78.1 |
| 5,833,298 | A | * | 11/1998 | Min | 296/96.2 |
| D404,688 | S | * | 1/1999 | Hanagan et al. | D12/85 |
| D410,890 | S | * | 6/1999 | Consaul | D12/317 |
| D414,735 | S | * | 10/1999 | Gerisch et al. | D12/196 |
| 5,960,901 | A | * | 10/1999 | Hanagan | 296/187.02 |
| 5,961,175 | A | * | 10/1999 | Clardy, Jr. | 296/77.1 |
| D416,528 | S | * | 11/1999 | Gerisch et al. | D12/196 |
| 6,010,173 | A | * | 1/2000 | Chyan-Luen | 296/78.1 |
| D424,979 | S | * | 5/2000 | Hanagan et al. | D12/85 |
| 6,230,836 | B1 | * | 5/2001 | Cowan et al. | 296/181.5 |
| 6,254,166 | B1 | * | 7/2001 | Willey | 296/96.21 |

* cited by examiner

*Primary Examiner*—Kiran B. Patel
(74) *Attorney, Agent, or Firm*—Young Basile Hanlon MacFarlane & Helmholdt, P.C.

(57) ABSTRACT

The disclosure relates to a detachable windshield for a vehicle. In certain embodiments, the disclosure relates to a detachable windshield for a motor vehicle such as an automobile, in particular an automobile having an engine compartment positioned forward of a passenger compartment. In one embodiment, a vehicle includes a detachable windshield, at least one structural member, and a plurality of releasable fasteners that attach the detachable windshield to the structural member. The windshield may be detached upon release of the fasteners. In another embodiment, a method includes placing a detachable windshield onto at least one structural member of a vehicle, and securing the detachable windshield to the structural member with a plurality of releasable fasteners. In a further embodiment, a vehicle includes means for viewing an outside area from within a vehicle, means for supporting the viewing means, and means for securing the viewing means to the supporting means.

26 Claims, 10 Drawing Sheets

DETACHABLE WINDSHIELD

TECHNICAL FIELD

The invention relates to windshields for motor vehicles including, for example, automobiles.

BACKGROUND

Passenger automobiles typically have a windshield opening defined by a surrounding body flange attached to pillars extending upward from side body panels. A windshield seal is usually attached around an edge of the windshield to seal the space between the windshield and the windshield opening defined by the body flange. The windshield seal is usually attached to the body flange, or is supported by a fastener fixedly mounted to the pillars. An opaque paint is generally applied to the inner peripheral surface of the windshield to conceal the aesthetically displeasing windshield seal from view.

Automotive windshields are commonly mounted to the associated vehicle body in a manner that leaves a space between the periphery of the glass panel and the body flange. In a conventional windshield mounting assembly, a bead of curable resilient adhesive is often used to fill this space, acting as part of the windshield seal and securing the glass windshield to the surrounding flange. In this manner, the windshield is securely attached to the automobile. However, when a windshield mounted in the conventional manner using adhesives needs to be replaced, it is usually impossible or extremely difficult to effect removal without causing damage to the windshield due to the adhesive bonding of the windshield seal.

SUMMARY

In general, the disclosure relates to a detachable windshield for a vehicle. In certain embodiments, the disclosure relates to a detachable windshield for a motor vehicle such as an automobile. In particular embodiments, disclosure relates to a detachable windshield for an automobile having an engine compartment positioned forward of a passenger compartment.

In one embodiment, a vehicle comprises a detachable windshield, at least one structural member, and a plurality of releasable fasteners that attach the detachable windshield to the structural member. The windshield may be detached upon release of the fasteners. In additional embodiments, the detachable windshield has a peripheral edge, and at least a portion of the peripheral edge is exposed to view before release of the fasteners to detach the windshield. In some embodiments, the vehicle is a motor vehicle comprising an engine compartment housing an engine.

In some exemplary embodiments, the detachable windshield may include an upper portion and a lower portion, and the lower portion may cover a rearward portion of the engine compartment and visibly exposes at least one component of the engine. In other exemplary embodiments, the detachable windshield comprises a continuous transparent element having a curvature, and the curvature separates the upper portion and lower portion of the detachable windshield. The lower portion of the windshield may be visible to a passenger of the vehicle through the upper portion of the windshield. In other exemplary embodiments, the curvature begins at a position where the detachable windshield begins to cover the rearward portion of the engine compartment.

In certain exemplary embodiments, the vehicle comprises a transparent engine cover that covers a central portion of the engine compartment proximate to the rearward portion of the engine compartment, and the lower portion of the detachable windshield is positioned around at least a portion of the transparent engine cover. In some embodiments, the vehicle further comprises a hood proximate to the transparent engine cover and covering a forward portion of the engine compartment proximate to the central portion of the engine compartment. In additional embodiments, the vehicle further comprises a hinge proximate to a leading edge of the hood that allows the hood to be raised away from the lower portion of the detachable windshield and the transparent hood cover. In certain exemplary embodiments, a rearward portion of the hood overlaps a leading edge of the detachable windshield. The rearward portion of the hood may meet the leading edge of the detachable windshield, and the interface between the hood and the leading edge of the detachable windshield may be a single plane.

In further exemplary embodiments, the vehicle comprises a cowl proximate to a leading edge of the detachable windshield. In certain exemplary embodiments, the detachable windshield is positioned around the cowl. In other exemplary embodiments, the detachable windshield surrounds the cowl. The cowl may comprise a fixture to receive at least one of a windshield washer assembly, a windshield wiper assembly, or a ventilation assembly.

In other exemplary embodiments, the structural member comprises a post. In certain exemplary embodiments, the post is formed of the structural member. In further exemplary embodiments, the post is attached to the structural member. In some embodiments, the detachable windshield comprises a hole to accept the post. A grommet may be positioned within the hole between the post and the detachable windshield. In some embodiments, each of the plurality of releasable fasteners comprises a washer. Each washer may comprise a padding material contacting a surface of the detachable windshield. In additional embodiments, each of the plurality of the releasable fasteners comprises a pin that is inserted through a hole in a post to secure the detachable windshield between the washer and the structural member. In further embodiments, each of the releasable fasteners comprises a fixing column inserted through a hole in the detachable windshield and a hole in the structural member to secure the detachable windshield between the washer and the structural member. The fixing column may comprise an internal release mechanism that couples to the structural member.

In additional exemplary embodiments, the vehicle comprises a gasket located between the detachable windshield and the structural member. At least a portion of the gasket may reside within the structural member and contact an inner surface of the detachable windshield. In some embodiments, the gasket contacts an inner surface of the detachable windshield and at least a portion of an edge of the detachable windshield. In further embodiments, the gasket rests in a channel formed on an inner perimeter of the structural member. The vehicle may further comprise a clamp having a pivot attached to the structural member, the clamp securing the detachable windshield to the structural member.

In another embodiment, a method comprises placing a detachable windshield onto at least one structural member of a vehicle, and securing the detachable windshield to the structural member with a plurality of releasable fasteners. In some exemplary embodiments, placing the detachable windshield onto the at least one structural member comprises inserting a post attached to the structural member through a hole in the detachable windshield. In other exemplary embodiments, securing the detachable windshield to the structural member with a plurality of releasable fasteners comprises inserting a pin of one of the releasable fasteners through the post. In further exemplary embodiments, securing the detachable windshield to the structural member with a plurality of releasable fasteners comprises inserting a fixing column through a hole in the detachable windshield and a hole in the structural member, and coupling the fixing column to the structural member with an internal release mechanism. In additional exemplary embodiments, the method further comprises removing the detachable windshield from the structural member by releasing the plurality of releasable fasteners.

In a further embodiment, a vehicle comprises means for viewing an outside area from within a vehicle, means for supporting the viewing means, and means for securing the viewing means to the supporting means. The viewing means may be detachable from the supporting means.

The disclosure may provide one or more advantages over the prior art. For example, a driver may be able to detach the windshield easily to facilitate maintenance. In addition, the windshield portion that covers the engine compartment may allow the driver to view engine components, check fluid levels, or display decorative components. The transparency of the windshield and engine cover, including exposing a peripheral edge, may enhance the aesthetic beauty of the vehicle. Providing a windshield with a curvature between an upper potion and a lower portion may also reduce the coefficient of drag of the vehicle when in motion.

The details of one or more embodiments of the disclosure are set forth in the accompanying drawings and the description below. Other features, objects, and advantages of the disclosure will be apparent from the description and drawings, and from the claims.

DETAILED DESCRIPTION

The disclosure will be directed, with reference, to the figures. Although the figures illustrate exemplary embodiments of a detachable windshield for an automobile, one skilled in the art will understand that the disclosure is not limited in application to automobiles. Other vehicles, both motorized and non-motorized, may be configured with a detachable windshield according to the present disclosure. Exemplary vehicles that may be advantageously configured with a detachable windshield according to the present disclosure include, but are not limited to, vans, trucks, sport utility vehicles, all terrain vehicles, motorcycles, trains, watercraft, and aircraft.

It will therefore be understood that the disclosure is not limited to the specific exemplary embodiments described herein, but includes all functional and structural equivalents. Furthermore, it should be understood that by specifying particular items or an order of items in the present disclosure (e.g., an order of steps to be performed), it is not meant to preclude additional items or intermediates between the items specified, as long as the specified items appear in the order as specified.

The foregoing summary of the disclosure is not intended to describe each disclosed embodiment or every implementation of the present disclosure. The details of one or more embodiments of the disclosure are set forth in the accompanying drawings and the description below. Other features, objects, and advantages of the disclosure will be apparent from the following detailed description and drawings, and from the claims.

Figure 1:
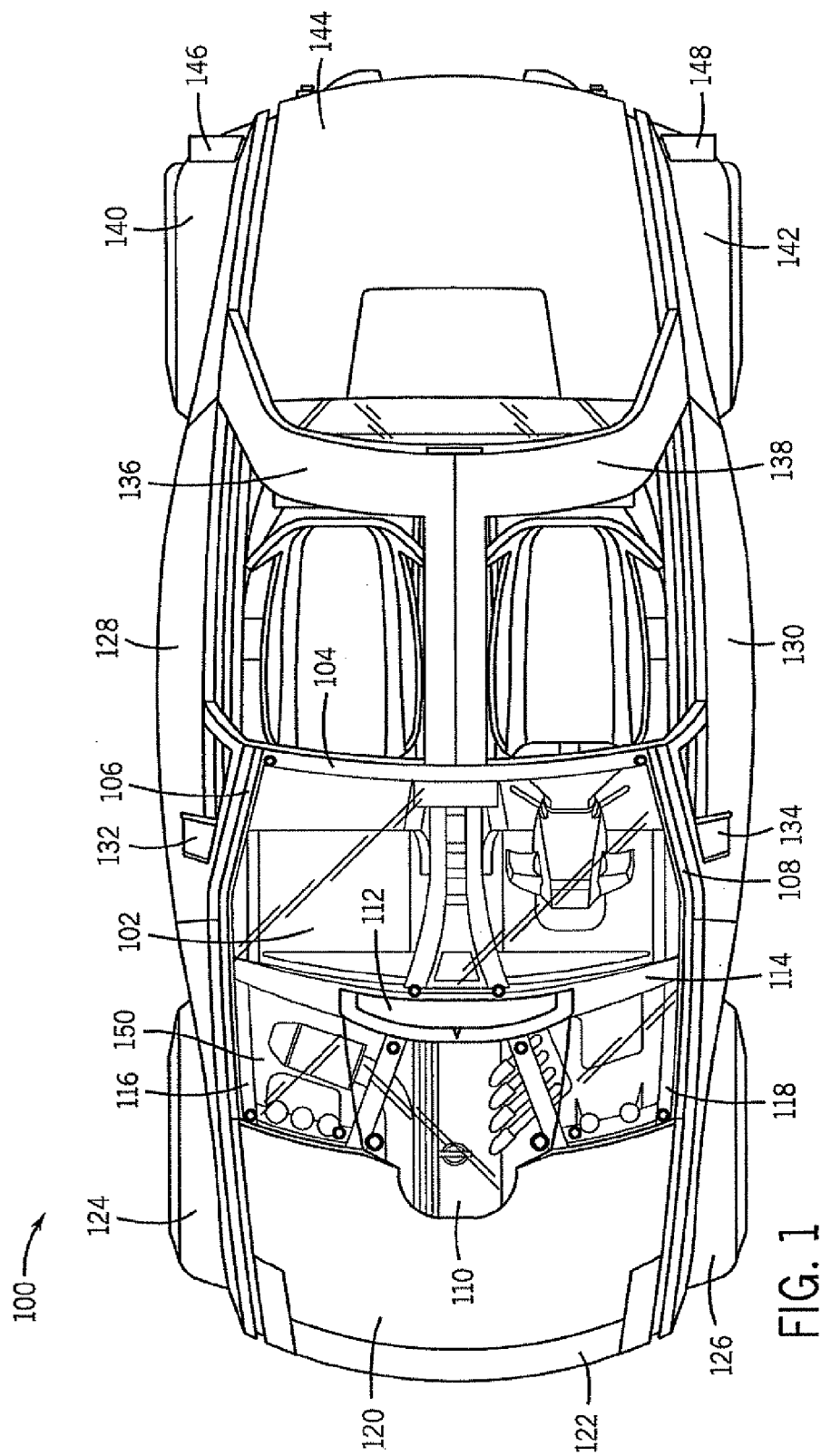
FIG. 1 is an illustration of a top view of a vehicle that includes an exemplary detachable windshield.

FIG. 1 is an illustration of a top view of vehicle 100 that includes exemplary detachable windshield 102. As shown in FIG. 1, vehicle 100 includes elements creating the structure of the vehicle. Detachable windshield 102, a means for viewing an outside area from within vehicle 100, is secured to structural members 104, 106, 108, 114, 116 and 118, or means for supporting the detachable windshield. Detachable windshield 102 surrounds cowl 112 and transparent engine cover 110. Hood 120 and nose 122 create the front portion of vehicle 100. Right front quarter panel 124 and left front quarter panel 126 are located above respective tires (not shown). Vehicle 100 also includes left roof support 138 and right roof support 136 in addition to left door 130 and right door 128. Left mirror 134 is mounted to left door 130, and right mirror 132 is mounted to right door 128. The rear portion of vehicle 100 includes left rear quarter panel 142, right rear quarter panel 140, trunk 144, left tail light 148 and right tail light 146.

Vehicle 100 provides transportation to one or more passengers, where the vehicle may utilize any type of motor or energy source to transport the passengers from one point to another point. As described herein, the exemplary vehicle 100 is a two-door automobile with a front mounted internal combustion engine. More specifically, vehicle 100 is a roadster designed with performance, utility, and aesthetics in mind. While a particular example of vehicle 100 is described herein as an example, other types of vehicles are contemplated and within the scope of the specification. For example, vehicle 100 may be a different type of automobile such as sedan, sports utility vehicle (SUV), truck, or compact vehicle. In other embodiments, vehicle 100 may utilize a diesel, hybrid, electric, or hydrogen engine to drive the wheels of the vehicle.

Vehicle 100 includes detachable windshield 102, which provides a user of the vehicle with utility, functionality and versatility. Detachable windshield 102 attaches to at least one of structural members 104, 106, 108, 114, 116 and 118. Releasable fasteners, or means for securing detachable windshield 102, are used to securely attach detachable windshield 102 to structural members 104, 106, 108, 114, 116 and 118, where the detachable windshield may be detached from the structural members once the releasable fasteners are released. In this manner, detachable windshield 102 may be easily removed for cleaning, replacement, maintenance of vehicle 100 components, or any other reason the user may want to detach the detachable windshield. When detachable windshield 102 is attached, at least portion of a peripheral edge of the detachable windshield is exposed to view. In other words, the edges of detachable windshield 102 are not completely encompassed as would be the case in a frame or other encompassing structure. In this manner, exposing the peripheral edge may be the benefit of an aesthetic nature. The advantage of an aesthetically pleasing exposed peripheral edge may increase the beauty or desirability of vehicle 100.

Detachable windshield 102 is located in front of a passenger cabin of vehicle 100 and may extend to cover a rearward portion of engine compartment 150. Therefore, an upper portion of detachable windshield 102 deflects wind from the passengers, while a lower portion of the detachable windshield visibly exposes at least one component within engine compartment 150. The passengers may be able to view the lower portion of detachable windshield 102 through the upper portion of the detachable windshield. Detachable windshield 102 includes a curvature that separates the upper and lower portions of the detachable windshield, wherein the curvature allows the detachable windshield to remain as one continuous transparent element. In some embodiments, the curvature may not affect the view of the passengers in vehicle 100. In other embodiments, the curvature may distort images as passengers within vehicle 100 view objects outside of the vehicle.

Detachable windshield 102 may be constructed out of a transparent material that is capable of withstanding many stresses. Some stresses may include torsion, tensile, compression, and fatigue. Exemplary materials that may be used in detachable windshield 102 include glass, automobile safety glass, tempered glass, or a polymer such as Plexiglas. In some embodiments, the transparent material may be tinted to block a portion of visible, ultraviolet, or infrared light.

Structural members 104, 106, 108, 114, 116 and 118 may or may not be a part of the frame of vehicle 100. Preferably, structural members 104, 106, 108, 114, 116 and 118 are formed as part of the frame to provide rigid support for detachable windshield 102. Further, one or more of structural members 104, 106, 108, 114, 116 and 118 may form a continuous structural member. In some embodiments, all structural members 104, 106, 108, 114, 116 and 118 form one continuous member for detachable windshield 102 to attach to. In this manner, detachable windshield 102 would attach to only one structural member. In other embodiments, more structural members may be utilized to securely attach detachable windshield 102 to vehicle 100.

Transparent engine cover 110 is located over an engine of vehicle 100, and is aligned with detachable windshield 102 such that the edges of each element meet to form a continuous shape. Transparent engine cover 110 may also be detachable from the structural members that releasable fasteners use to secure the engine cover, similar to detachable windshield 102. Transparent engine cover 110 may be constructed of the same materials used to construct detachable windshield 102. In some embodiments, transparent engine cover 110 may take a shape compatible to the engine the cover fits over.

Near the rearward side of engine compartment 150, cowl 112 is positioned within detachable windshield 102. Alternatively, detachable windshield 102 is positioned around cowl 112. Cowl 112 may be proximate to a leading edge of detachable windshield 102 or completely encompassed, or surrounded, by the detachable windshield. Cowl 112 may provide fixture points for many functional elements of vehicle 100. For example, cowl 112 may provide a fixture to attach a windshield washer assembly or a windshield wiper assembly. Alternatively, cowl 112 may include a fixture to secure a ventilation assembly. In other embodiments, cowl 112 may include a transmitter for wireless applications, a thermometer, or other instrumentation.

Hood 120 of vehicle 100 covers a forward portion of engine compartment 150 and is located proximate, or near, transparent engine cover 110. The forward portion of engine compartment 150 is proximate to a central portion of the engine compartment. In other words, hood 120 may be located over, under or directly adjacent to transparent engine cover 110. In other embodiments, hood 120 may be separated from transparent engine cover 110 by a gap or a compliant material such as a rubber or foam spacer. Hood 120 also includes a hinge (not shown) located proximate to a leading edge of the hood, near nose 122. The hinge allows hood 120 to be raised away from the lower portion of detachable windshield 102 and transparent engine cover 110. In some embodiments, a rearward portion of hood 120 may overlap a leading edge of detachable windshield 102. The leading edge of detachable windshield 102 may also be the forward edge or closest edge to hood 120.

Vehicle 100 also includes other components that make up the body, or other portions of the vehicle. Nose 122 is located at the front of vehicle 100 under hood 120. Left front quarter panel 126 and right front quarter panel 124 are located above a respective tire (not shown) to prevent road debris from becoming airborne during driving. Each quarter panel 124 and 126 extends from the body of vehicle 100. Right door 128 and left door 130 are also located next to each passenger seat to allow each passenger to enter and exit vehicle 100. Mirrors 132 and 134 are attached to each respective door 128 and 130 and allow a driver to view objects to the rear of vehicle 100.

The top of vehicle 100 includes left roof support 138 and right roof support 136 to provide safety to passengers in the case of a rollover and to provide frame rigidity. Trunk 144 is located at the rear of vehicle 100 between right rear quarter panel 140 and left rear quarter panel 142. Trunk 144 may be raised to expose spare parts, storage space, or other mechanical components. Tail lights 146 and 148 are located on respective quarter panels 140 and 142.

The size of vehicle 100 may vary as desired. Typically, vehicle 100 may have a size suitable for holding human passengers of adult age, where the passengers are of average height and weight. Interior structures such as seats, steering wheels, and controls may be movable to accommodate varying sized passengers. Vehicle 100 may include many more components, elements, or features not explicitly described herein. Such features may be identified in FIG. 1 or common to automobile functionality. Other features may be described in greater detail herein.

Figure 2:
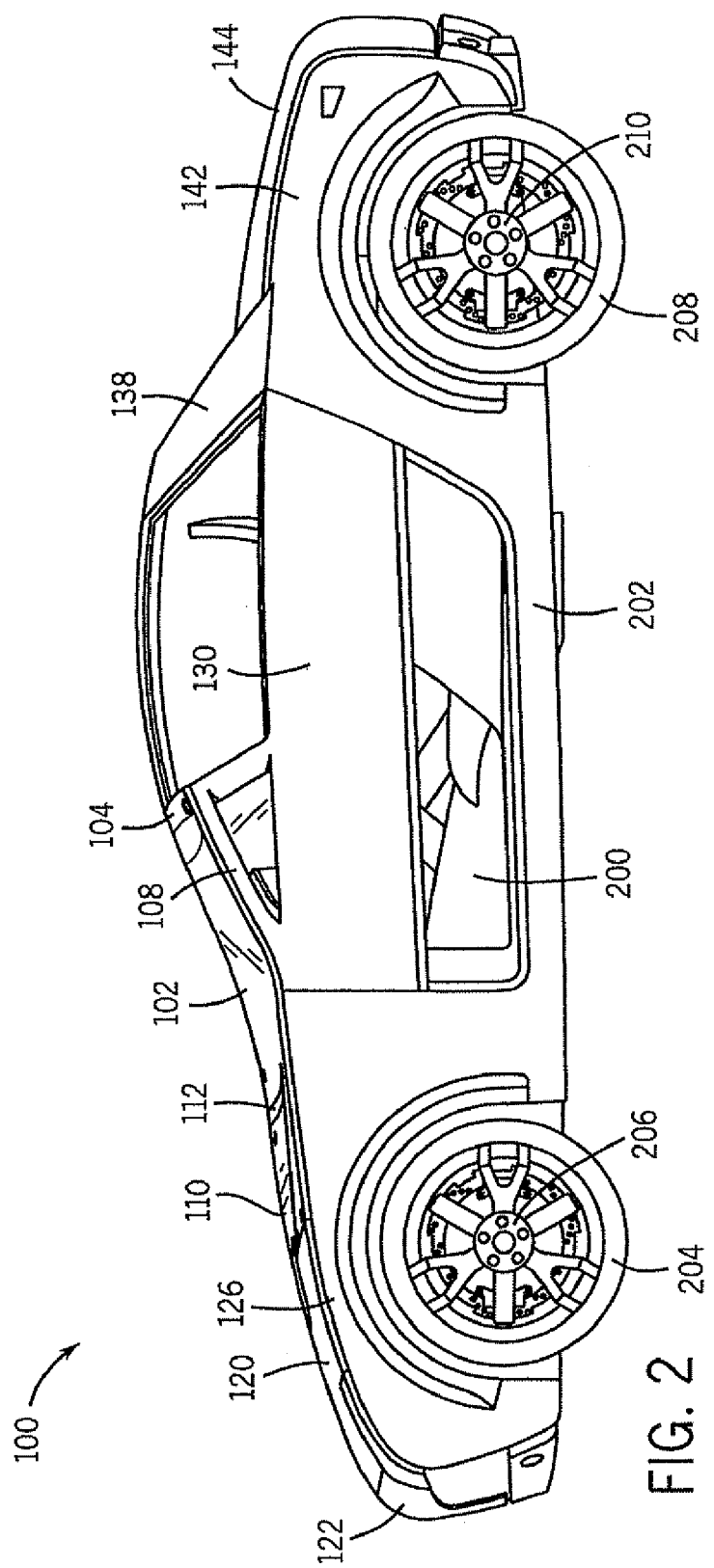
FIG. 2 is an illustration of a side view of a vehicle that includes an exemplary detachable windshield and a closed partial hood.

FIG. 2 is an illustration of a side view of vehicle 100 that includes exemplary detachable windshield 102 and closed hood 120. As shown in FIG. 2, vehicle 100 includes many of the elements described in FIG. 1. In addition, vehicle 100 includes door window 200, main body 202, front left tire 204, rear left tire 208, front left wheel 206, and rear left wheel 210.

Door window 200 provides a view into the interior of vehicle 100. In some embodiments, door window 200 may retract into left door 130 in order to provide ventilation to the passenger. Main body 202 provides protection to the underlying frame and mechanical components not shown of vehicle 202.

Front and rear left tires 204 and 208 are mounted to front and rear left wheels 206 and 210, respectively. Tires 204 and 208 may be constructed of rubber and include a tread (not shown) conducive for adhering to automotive roads. Tires 204 and 208 may be low profile to reduce wall roll when vehicle 100 is cornering. Wheels 206 and 210 may be constructed of aluminum, aluminum alloy, or some other metal alloy used in constructing wheels. Wheels 206 and 210 provide attachment of brake rotors such that vehicle 100 may reduce speeds during travel.

Figure 3:
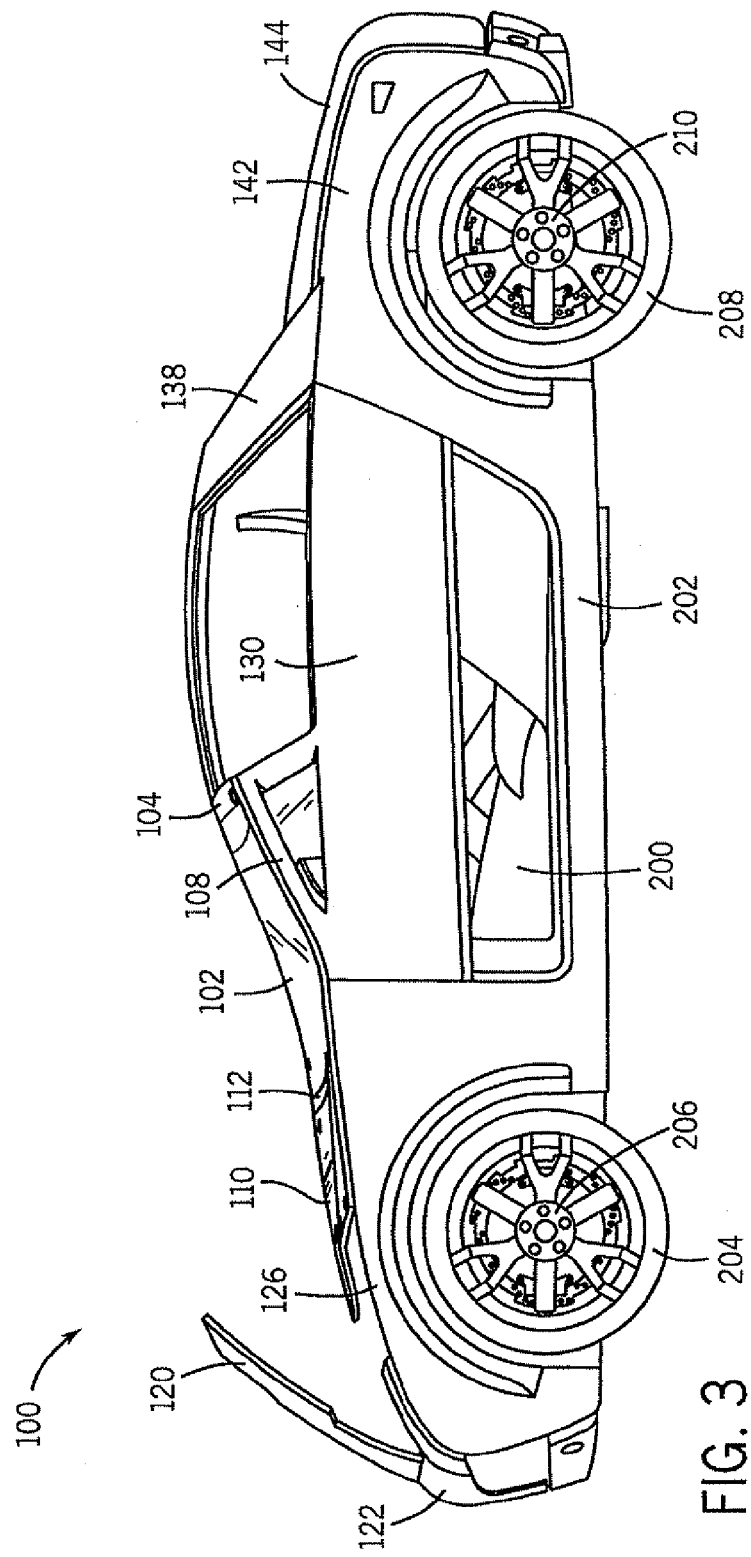
FIG. 3 is an illustration of a side view of a vehicle that includes an exemplary detachable windshield and an open partial hood.

FIG. 3 is an illustration of a side view of vehicle 100 that includes exemplary detachable windshield 102 and open hood 120. As shown in the example of FIG. 3, vehicle 100 displays hood 120 in the open position. The hinge of hood 120 is located at the leading edge of the hood, near nose 122. Once hood 120 is released from a control within the passenger cabin of vehicle 100, a user may lift the rearward portion of the hood to expose the front portion of engine compartment 150. This opening may expose the leading edge of detachable windshield 102.

The hinge may be located in the center of hood 120 or include multiple hinges located at more than one position along the leading edge of the hood. In other embodiments, the hinge may instead be a lifting mechanism that lifts hood 120 in the manner shown from a location other than the leading edge of the hood. Such a lifting mechanism may be located along the sides of hood 120 and mounted to the frame. This lifting mechanism may be similar to a scissors lift or hinged arm.

Hood 120 may include pneumatic or hydraulic mechanisms to aid in opening the hood or provide force to keep the hood open. These mechanisms may be particularly helpful if only one person is performing maintenance in engine compartment 150. In alternative embodiments, hood 120 may include a hinge located near the leading edge of detachable windshield 102. In this case, hood 120 may open at the leading edge of the hood.

Figure 4:
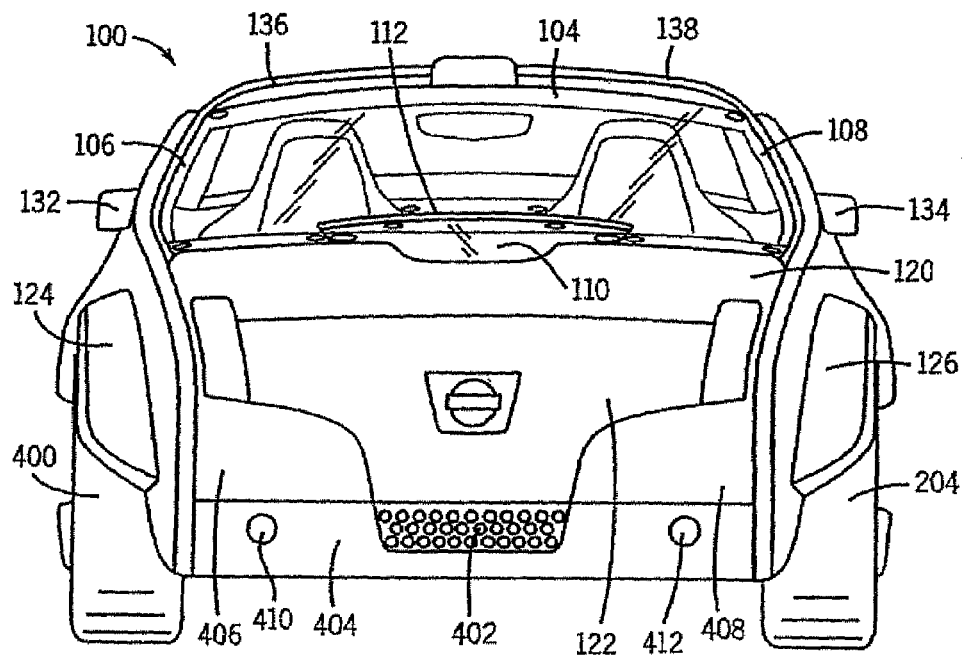
FIG. 4 is an illustration of a front view of a vehicle that includes an exemplary detachable windshield.

FIG. 4 is an illustration of a front view of vehicle 100 that includes exemplary detachable windshield 102. As shown in FIG. 4, many components of vehicle 100 have already been described in FIG. 1. In addition, front right tire 400 is displayed under front right quarter panel 124. Air scoop 402 is located within front molding 404 that extends the majority of the width of vehicle 100. Front molding 404 also surrounds fog lamps 410 and 412. Grilles 406 and 408 provide channels for air to reach a radiator (not shown) that cool the engine (not shown).

Figure 5:
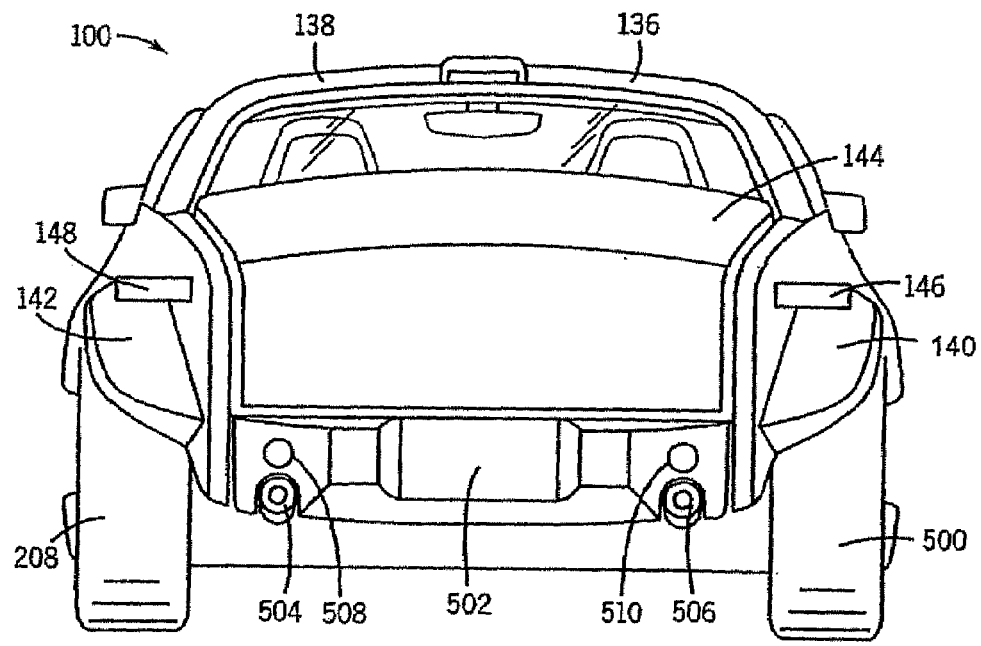
FIG. 5 is an illustration of a rear view of a vehicle that includes an exemplary detachable windshield.

FIG. 5 is an illustration of a rear view of vehicle 100. As shown in FIG. 5, many components of vehicle 100 have already been described in FIG. 1. In addition, right rear tire 500 is shown under right rear quarter panel 140. Rear molding 502 is shaped to hold a license plate and provides ports for other components. Backup lights 508 and 510 are provided within rear molding 502. Tail pipes 504 and 506 are the end of an exhaust system, and the tail pipes may extend beyond rear molding 502.

Figure 6:
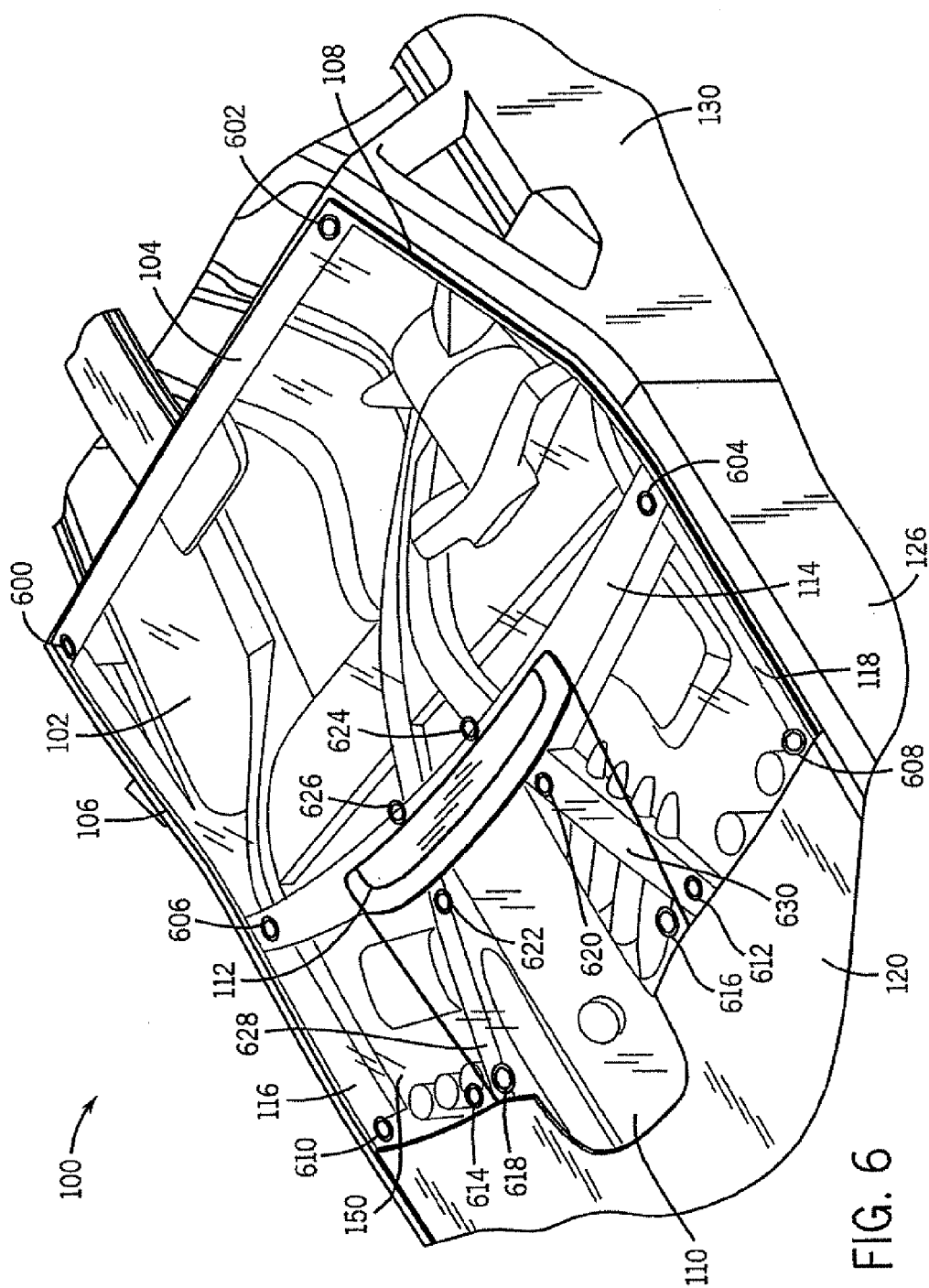
FIG. 6 is a perspective view of an exemplary detachable windshield coving a portion of an engine compartment.

FIG. 6 is a perspective view of detachable windshield 102 coving a portion of engine compartment 150. As shown in FIG. 6, some components of vehicle 100 are already described in FIG. 1, such as detachable windshield 102 and structural members 104, 106, 108, 114, 116 and 118. In addition, releasable fasteners 600–626 attach detachable windshield 102 and transparent engine cover 110 to structural members 104, 106, 108, 114, 116, 118, 628 and 630.

Releasable fasteners 600 and 602 attach windshield 102 to structural member 104. Releasable fasteners 604, 624, 626 and 606 attach windshield 102 to structural member 114. Releasable fastener 608 attaches windshield 102 to structural member 118, and releasable fastener 610 attaches the windshield 102 to structural member 116. Releasable fasteners 612 and 614 attach windshield 102 to structural members 630 and 628, respectively. Transparent engine cover 110 is attached to structural member 628 by releasable fasteners 618 and 622, and the transparent engine cover 110 is attached to structural member 630 by releasable fasteners 616 and 620. Releasing all releasable fasteners 616–622 allows transparent engine cover 110 to be detached from vehicle 100, while releasing all releasable fasteners 600–614 and 624–626 allows detachable windshield 102 to be detached from vehicle 100.

In some embodiments, more or less releasable fasteners may be utilized to attach detachable windshield 102 to structural members 104, 106, 108, 114, 116, 118, 628 and 630. The number and placement of the releasable fasteners may depend on the shape of vehicle 100 or the function that the vehicle will have. In addition, the number and placement of the fasteners may be determined based upon the material properties of detachable windshield 102 or transparent engine cover 110.

In other embodiments, each structural member may include a formed or attached member that contacts the respective releasable fastener. This type of formation may be necessary to accommodate certain shapes and sizes of detachable windshields or transparent engine covers.

Figure 7:
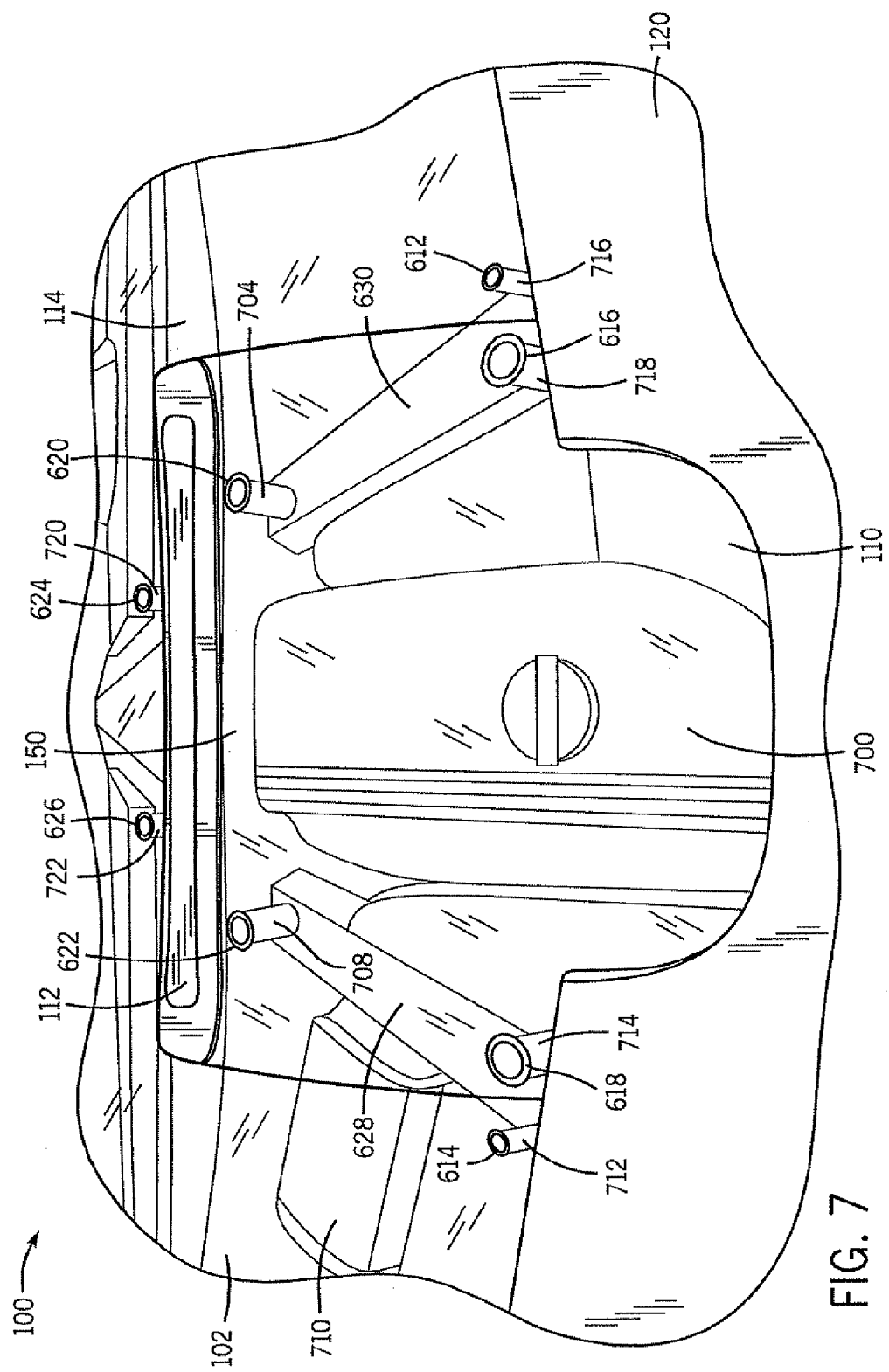
FIG. 7 is an alternative perspective view of an exemplary detachable windshield coving a portion of an engine compartment.

FIG. 7 is an alternative perspective view of exemplary detachable windshield 102 and transparent engine cover 110 covering a portion of engine compartment 150. As shown in FIG. 7, detachable windshield 102 and transparent engine cover 110 cover components of the engine within engine compartment 150. Releasable fasteners 614 and 612 of detachable windshield 102 attach to structural member columns 712 and 716, respectively. Releasable fasteners 624 and 626 of detachable windshield 102 attach to structural member columns 720 and 722, respectively. Releasable fasteners 616 and 618 of transparent engine cover 110 attach to structural member columns 718 and 714, respectively. Releasable fasteners 620 and 622 of transparent engine cover 110 attach to structural member columns 704 and 708, respectively. Engine compartment 150 includes engine 700 beneath transparent engine cover 110 and air filter 710 beneath detachable windshield 102, in addition to many other components not shown.

Structural member columns 704, 716 and 718 are mounted to structural member 630 while structural member columns 708, 712 and 714 are mounted to structural member 628. Structural member columns 720 and 722 are mounted to structural member 114. The structural member columns are included in vehicle 100 to match the height of detachable windshield 102 or transparent engine cover 110. The structural member columns may be formed of the associated structural member or attached through some method of welding, brazing, or adhering. In some embodiments, each structural member column may be considered a part of the respective structural member.

In some cases, a user may add spacers to increase the height of transparent engine cover 110. In this manner, the user may modify a component of engine compartment 150 and need extra space for the component to fit. Alternatively, the user may detach transparent engine cover 110 and attach a new engine cover to fit over the new engine component. In addition, detachable windshield 102 may be detached and replaced with a different detachable windshield to accommodate different shapes, tints or sizes of the windshield.

Figure 8:
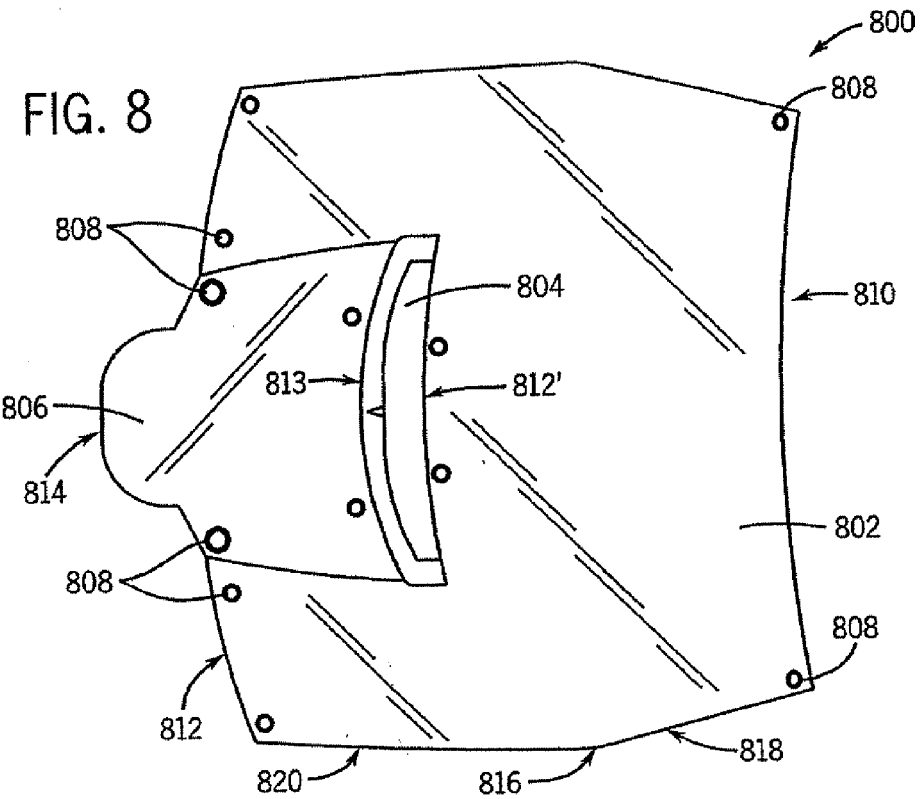
FIG. 8 is an illustration of a top view of an exemplary detachable windshield.

FIG. 8 is a top view illustration of an exemplary detachable assembly 800 and transparent engine cover 806, such as transparent engine cover 110, used in a detachable assembly 800 according to an embodiment of the present disclosure. Detachable windshield 802, such as detachable windshield 102, is transparent to some degree, preferably allowing all light through the windshield. The illustrated detachable windshield 802 is a continuous unitary transparent element having a curvature 816 that separates an upper portion 818 and a lower portion 820. The exemplary detachable windshield 802 has a trailing edge 810 and leading edges 812 and 812'. The exemplary transparent engine cover 806 has a trailing edge 813 and a leading edge 814 and is positioned such that the lower portion 820 of the detachable windshield 802 is positioned around at least a portion of the transparent engine cover 806 as shown in FIG. 8.

A cowl 804, such as cowl 112, may be positioned proximate to the leading edge 812' of the detachable windshield 802. The detachable windshield 802 may be positioned around the cowl 804 as illustrated by FIG. 8, or alternatively, the detachable windshield 802 may surround the cowl 804 in an embodiment not illustrated in FIG. 8. The cowl 804 may include a fixture adapted to receive at least one of a windshield washer assembly, a windshield wiper assembly, or a ventilation assembly (not shown in FIG. 8).

In some embodiments, the transparent engine cover 806 may also be detachable from the vehicle. A plurality of holes 808 extending through surfaces of the detachable transparent engine cover 806 and the detachable windshield 802 may be used in conjunction with a plurality of releasable fasteners (not shown in FIG. 8) to attach the detachable windshield 802 and the detachable transparent engine cover 806 to structural members of a vehicle (not shown in FIG. 8).

Figure 9:
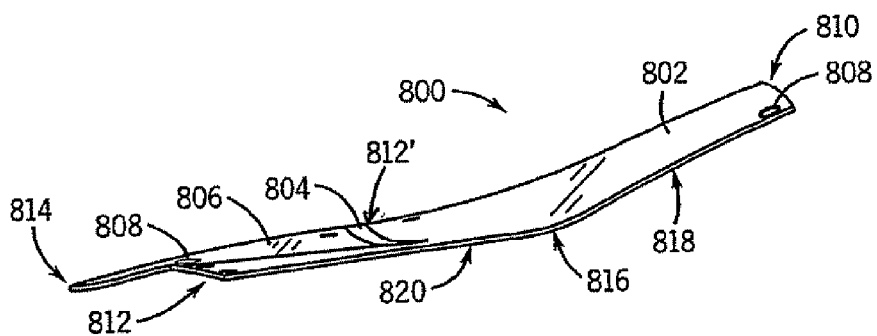
FIG. 9 is an illustration of a side view of an exemplary detachable windshield.

FIG. 9 illustrates a side view of the exemplary detachable windshield 802 of FIG. 8. FIG. 9 more clearly shows a curvature 816 that separates an upper portion 818 and a lower portion 820 of the detachable windshield 800. Like numbered reference numerals in FIG. 9 identify identical structures as described in FIG. 8, and will not be further described.

Figure 10:
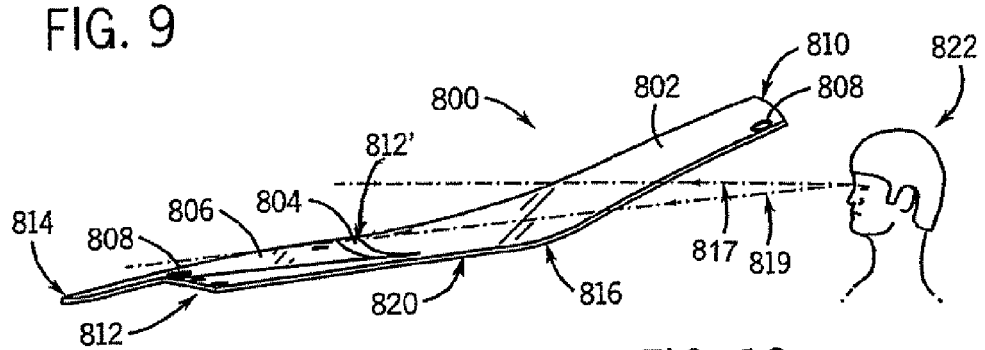
FIG. 10 is an illustration of a side view of an exemplary detachable windshield showing the view of the vehicle driver.

FIG. 10 illustrates another side view of the exemplary detachable windshield 802 of FIGS. 8 and 9. FIG. 10 illustrates an embodiment in which a passenger (e.g. a driver) 922 of the vehicle may look through the transparent upper portion 818 of the detachable windshield 802 along a first line of sight 817 to view the field in front of the vehicle, for example, a roadway. FIG. 10 also illustrates another embodiment in which the transparent lower portion 820 of the windshield 802 is visible to a passenger 822 along a second line of sight 819. By viewing the transparent lower portion 820 along line of sight 819, the passenger may observe one or more engine components (not shown in FIG. 10). Exemplary engine components may include cylinders, pistons, valves, fuel injectors, air cleaners, spark plugs and the like. Exemplary engine components may also include peripheral engine operation components such as batteries, fuses, gauges, indicator lights and reservoirs, for example, reservoirs for fuel, oil, transmission fluid, brake fluid, windshield washer fluid and the like.

Figure 11:
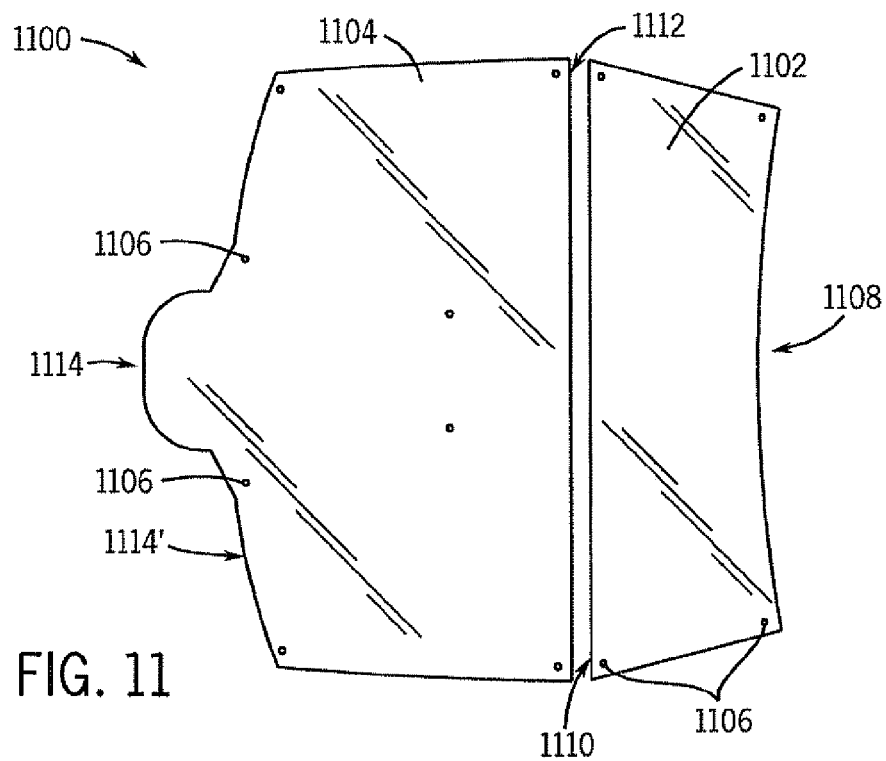
FIG. 11 is an illustration of an exemplary detachable windshield and glass engine cover.

FIG. 11 is an illustration of an exemplary detachable windshield 1102 and transparent engine cover 1104 used in a windshield and engine cover assembly 1100 according to another embodiment of the disclosure. The illustrated detachable windshield 1102 is a continuous unitary transparent element defining an upper transparent portion for the assembly 1100. The illustrated transparent engine cover 1104 is a continuous unitary transparent element defining a lower transparent portion for the assembly 1100. The exemplary detachable windshield 1102 has a trailing edge 1108 and a leading edge 1110. The exemplary transparent engine cover 1104 has a trailing edge 1112 and leading edges 1114 and 1114'. In this embodiment, a cowl (not shown in FIG. 11) is not positioned proximate to the leading edge 1110 of the detachable windshield 1102, although in other non-illustrated embodiments, a cowl may be used.

A plurality of holes 1106 extending through surfaces of the transparent engine cover 1104 and the detachable windshield 1102 may be used in conjunction with a plurality of releasable fasteners (not shown in FIG. 11) to attach the detachable windshield 1102 and the detachable transparent engine cover 1104 to structural members of a vehicle (not shown in FIG. 11).

Figure 12:
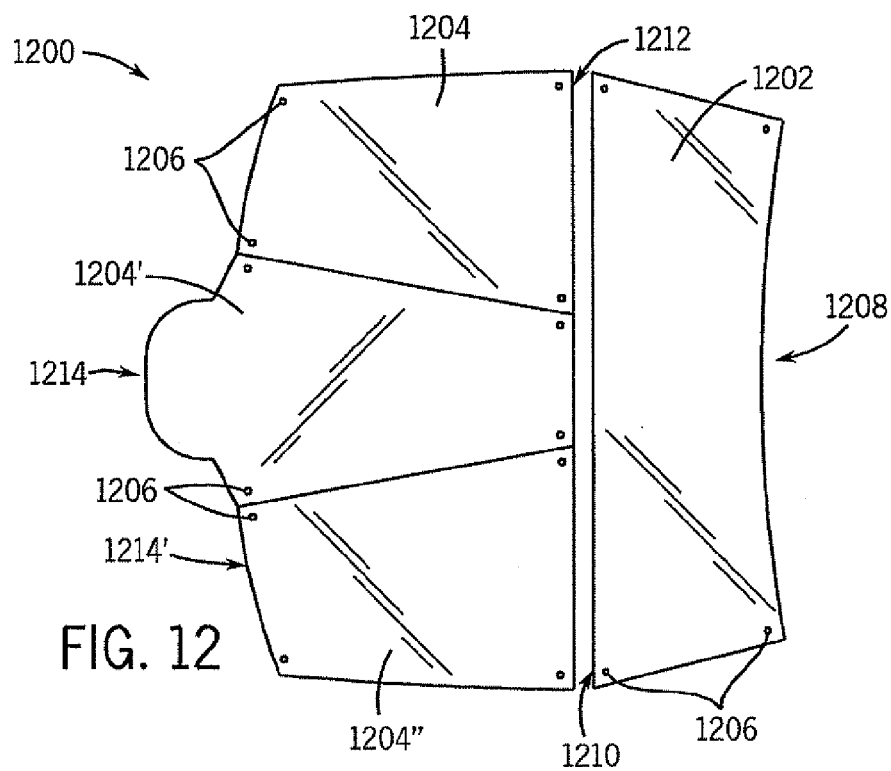
FIG. 12 is an illustration of an exemplary detachable windshield and multiple glass engine covers.

FIG. 12 is an illustration of an exemplary detachable windshield 1202 and multiple transparent engine covers 1204, 1204' and 1204" used in a windshield and engine cover assembly 1200 according to another embodiment of the disclosure. Although the illustrated embodiment shows three transparent engine covers 1204, 1204' and 1204," fewer or additional transparent engine covers may be used, for example, to achieve a desired aesthetic effect. The number of transparent engine covers used in a vehicle is limited primarily by the manufacturing complexity and vehicle assembly cost.

The illustrated detachable windshield 1202 is a continuous unitary transparent element defining an upper transparent portion for the assembly 1200. The illustrated transparent engine covers 1204, 1204' and 1204" are separate transparent elements defining lower transparent portions for the assembly 1200. The exemplary detachable windshield 1202 has a trailing edge 1208 and a leading edge 1210.

The exemplary transparent engine covers 1204, 1204' and 1204" have trailing edges, as illustrated by trailing edge 1212 of transparent engine cover 1204, and leading edges, as illustrated by leading edge 1214 of transparent engine cover 1204' and leading edge 1214' of transparent engine cover 1204". In FIG. 12, the transparent engine covers 1204, 1204' and 1204'" are shown with trailing edges (e.g. trailing edge 1212 of transparent engine cover 1204) generally aligned in a line, although in some non-illustrated embodiments the trailing edges may be offset, for example, to achieve a decorative effect or to selectively expose engine components within the engine compartment. In the particular embodiment illustrated by FIG. 12, a cowl is not positioned proximate to the leading edge 1210 of the detachable windshield 1202, although in other non-illustrated embodiments a cowl may be used.

A plurality of holes 1206 extending through surfaces of the transparent engine covers 1204, 1204' and 1204" and the detachable windshield 1202 may be used in conjunction with a plurality of releasable fasteners (not shown in FIG. 12) to attach the detachable windshield 1202 and the detachable transparent engine covers 1104, 1104' and 1104" to structural members of a vehicle (not shown in FIG. 12).

In some embodiments, the detachable windshield and/or transparent engine cover may have a seal or gasket positioned between the detachable windshield and/or transparent engine cover and a structural member of the vehicle. Use of a seal or gasket is distinguished from the adhesive seals known in the art, as the seals or gaskets according to the present disclosure preferably do not permanently bond or fix to the surface of the detachable windshield or engine cover. Preferably, the seal or gasket comprises a non-adhesive, elastomeric material such as a natural or synthetic rubber, for example, a silicone or EPDM rubber. Preferably the seal or gasket comprises a material that does not undergo a curing chemical reaction subsequent to contact with the detachable windshield. The seal may have a generally rectangular cross-section (e.g. a flat seal), or in some embodiments, may have a generally circular cross-section (e.g. an O-ring seal).

Figure 13A:
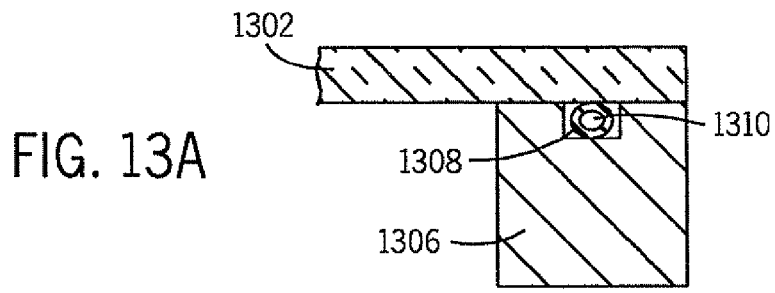
FIG. 13 is a cross-section of a gasket residing within a structural member.
Figure 13B:
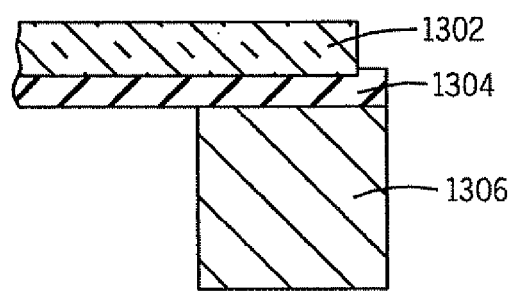

FIGS. 13A and 13B illustrate exemplary embodiments of seals or gaskets according to the present disclosure. FIG. 13A illustrates a cross-sectional view of a gasket 1310 contacting an inner surface of detachable windshield 1302 and positioned between the inner surface of the windshield 1302 and a structural member 1306. Structural member 1306 may be similar to any structural members 104, 106, 108, 114, 116, 118, 628 and 630 described herein. In the embodiment illustrated in FIG. 13A, the seal or gasket 1310 (an O-ring is illustrated) rests within a channel 1308 formed on an inner perimeter of the structural member 1306. FIG. 13B illustrates a cross-sectional view of a gasket 1304 positioned between the inner surface of the windshield 1302 and a structural member 1306. In the embodiment illustrated in FIG. 13B, the seal or gasket 1304 (a flat seal is illustrated) contacts the inner surface of the windshield 1302 and at least a portion of an edge of the detachable windshield 1302. The gasket illustrated in FIG. 13B may provide additional cushioning of the detachable windshield 1302 with respect to the structural member 1306, thereby preventing breakage of windshield glazing material (e.g. safety glass) to motion or vibration of the structural member 1306 resulting from operation of the vehicle.

Figure 14A:
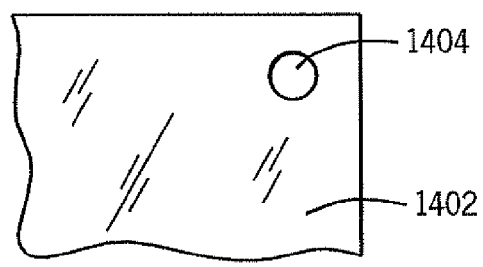
FIG. 14 is a cross-section of a gasket contacting a portion of an edge of the detachable windshield.
Figure 14B:
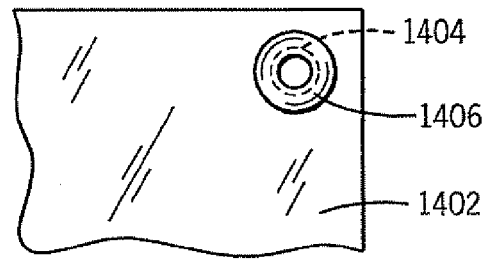

FIGS. 14A and 14B illustrate cross-sectional views of a gasket-contacting portion 1402 of an edge of the detachable windshield, illustrating an exemplary hole 1404 extending through a surface of the windshield and useful in attaching the windshield to a structural member of a vehicle. Preferably, the surface of the gasket-contacting portion 1402 is smooth and planar to provide a good sealing surface, thereby keeping wind and moisture from penetrating the seal and entering the internal passenger compartment of the vehicle. Preferably, a hole 1404 extending through a surface of the windshield and useful in attaching the windshield to a structural member of a vehicle is positioned proximate to the gasket-contacting portion 1402 in order to effect close engagement between the gasket-contacting portion 1402 and the gasket (not shown in FIG. 14A).

FIG. 14B illustrates use of a grommet 1406 positioned within the hole 1404. The grommet 1406 may have a generally cylindrical shape with an open center core through which a post or other means of attachment to the structural member may pass for mounting the detachable windshield to a vehicle. Preferably, the grommet 1406 comprises a non-adhesive, elastomeric material such as a natural or synthetic rubber, for example, a silicone or EPDM rubber. FIGS. 14A and 14B highlight exposing a peripheral edge of detachable windshield 802 or transparent engine cover 806, for example. Exposing the peripheral edge enhances the aesthetic beauty of vehicle 100.

According to some embodiments of the present disclosure, a detachable windshield is attached to at least one structural member of a vehicle using a plurality of releasable fasteners. The nature and type of releasable fastener is not particularly critical. Suitable releasable fasteners include post and pin assemblies, nut and bolt assemblies, shank and pin assemblies, toggle bolts, clevis pins and the like. In some embodiments, the releasable fastener comprises a pin or shank inserted through one of a plurality of holes extending through surfaces of the detachable windshield to attach the detachable windshield to structural members of a vehicle.

Figure 15:
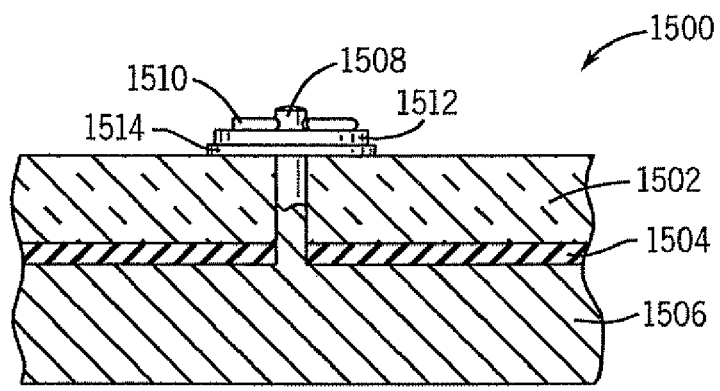
FIG. 15 is a cross-section of an exemplary releasable fastener securing a detachable windshield to a structural member with a post.

FIG. 15 illustrates one embodiment for attaching a detachable windshield 1502, such as detachable windshield 102 or 802, to a structural member 1506 using a post 1508 and pin 1510 of fastener assembly 1500. Fastener assembly 1500 may be similar to other fasteners described herein, such as releasable fasteners 600–626. A gasket 1504 is shown interposed between an interior surface of the detachable windshield 1502 and a gasket-contacting surface of the structural member 1506. The structural member 1506 comprises a post 1508 extending from the structural member 1506 through holes in the gasket 1504 and detachable windshield 1502. A soft washer 1514 comprising a padding material is shown positioned over the post 1508 above the detachable windshield 1502, and a rigid washer 1512 (e.g. a metal washer) is shown positioned over the post 1508 above the soft washer 1514. A pin 1510 is shown inserted orthogonally through a hole (not shown in FIG. 15) proximate to the end of the post 1508. In some embodiments, an optional grommet (not shown in FIG. 15) may be positioned within the windshield holes between the post 1508 and the detachable windshield 1502.

Figure 16:
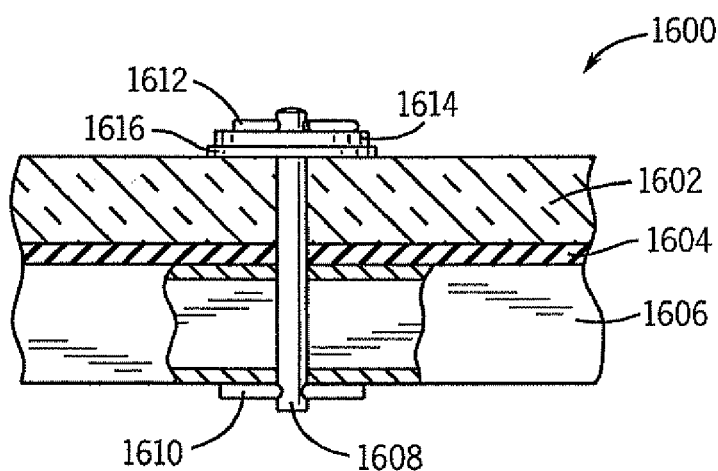
FIG. 16 is a cross-section of an exemplary fixing column securing a detachable windshield to a structural member.

FIG. 16 illustrates another embodiment for attaching a detachable windshield 1602 to a structural member 1606 using a shank 1608 and pin 1612 of fastener assembly 1600. Fastener assembly 1600 may be similar to other fasteners described herein, such as releasable fasteners 600–626. A gasket 1604 is shown interposed between an interior surface of the detachable windshield 1602 and a gasket-contacting surface of the structural member 1606. A generally cylindrical shank 1608 is shown extending through a hole in the structural member 1606, a hole in the gasket 1604, and a hole in the detachable windshield 1602. A soft washer 1616 comprising a padding material is shown positioned over a first end of the shank 1608 proximate to the detachable windshield 1602, and a rigid washer 1614 (e.g. a metal washer) is shown positioned over the shank 1608 above the soft washer 1616. A first pin 1612 is shown inserted orthogonally through a hole (not shown in FIG. 16) proximate to the first end of the shank 1608. A second pin 1610 is shown inserted orthogonally through a hole (not shown in FIG. 16) proximate to a second end of the shank 1608 proximate to the structural member 1606. In some embodiments, an optional grommet (not shown in FIG. 15) may be positioned within the windshield holes between the shank 1608 and the detachable windshield 1602.

In variation of the embodiment illustrated in FIG. 16, a clevis pin may be substituted for the shank 1608. The clevis pin eliminates the need to use one of the first 1612 or second 1610 pins. Clevis pins comprise a generally cylindrical shank having a head at one end. The head of the clevis pin has a diameter larger than the diameter of the clevis pin shank. Preferably, the clevis pin comprises a head proximate to one end having a diameter larger than at least one of the mounting hole in the detachable windshield or the mounting hole in the structural member 1606.

Figure 17:
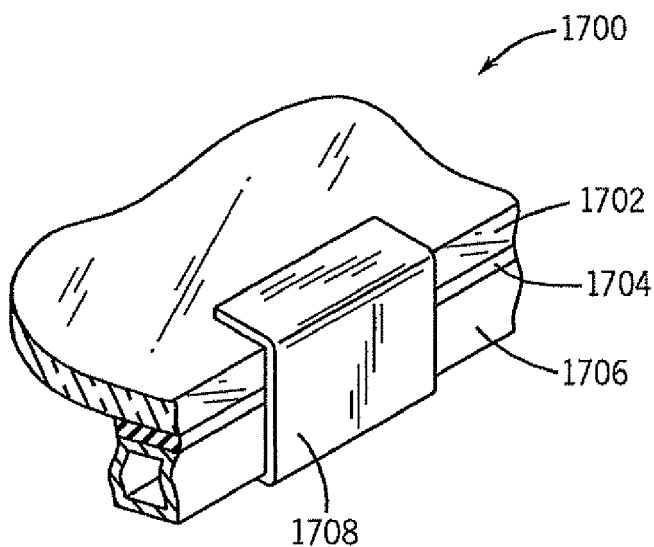
FIG. 17 is a perspective view of an exemplary clamp securing a detachable windshield to a structural member.

In another alternative embodiment, a plurality of releasable clamp assemblies may be used to attach a windshield to a structural element of a vehicle. FIG. 17 illustrates a perspective view of an exemplary clamp assembly 1700 comprising a releasable clamp 1708 securing a detachable windshield 1702 to a vehicle structural member 1706. In the embodiment of FIG. 17, a gasket 1704 is shown contacting an inner surface of the detachable windshield 1702 and positioned between the inner surface of the windshield 1702 and the structural member 1706. The releasable clamp 1708 may have a pivot (not shown in FIG. 17) attached to the structural member 1706.

Various embodiments of the disclosure have been described. These and other embodiments are within the scope of the following claims.

The invention claimed is:

1. A vehicle including an engine compartment for an engine, comprising:
   a windshield including an upper portion and a lower portion; and
   at least one structural member;
   wherein the windshield is attached to the structural member; and wherein the lower portion covers a rearward portion of the engine compartment such that at least one component of the engine is externally viewable through the lower portion under all operating conditions.

2. The vehicle of claim 1, wherein the windshield has a peripheral edge, and wherein at least a portion of the peripheral edge is exposed to view when the windshield is attached to the structural member.

3. The vehicle of claim 1 wherein the windshield is a continuous transparent element comprising a curvature, and wherein the curvature separates the upper portion and lower portion of the windshield.

4. The vehicle of claim 3, wherein the lower portion of the windshield is viewable to a passenger located inside the vehicle through the upper portion of the windshield.

5. The vehicle of claim 4, wherein the curvature begins at a position where the lower portion begins to cover the rearward portion of the engine compartment.

6. The vehicle of claim 1 wherein the lower portion of the windshield comprises a transparent engine cover centered with respect to a longitudinal axis of the vehicle.

7. The vehicle of claim 6, further comprising a hood covering a portion of the engine compartment.

8. The vehicle of claim 6, wherein a rearward portion of the hood overlaps a forward edge of the lower portion.

9. The vehicle of claim 1, further comprising a cowl located adjacent the upper portion and the lower portion such that the cowl is at least partially surrounded by the windshield.

10. The vehicle of claim 1, wherein the windshield is attached to the at least one structural member using a post, wherein the post is integral with or fixedly attached to the at least one structural member.

11. The vehicle of claim 10 wherein the windshield comprises a detachable windshield having a hole to accept the post.

12. The vehicle of claim 11, further comprising a grommet positioned within the hole between the post and the detachable windshield.

13. The vehicle of claim 1 wherein the windshield is a detachable windshield, the vehicle further comprising:
   a plurality of releasable fasteners that attach the detachable windshield to the structural member, wherein the windshield is detachable upon release of the fasteners.

14. The vehicle of claim 13, wherein each of the plurality of releasable fasteners comprises a washer formed of a padding material contacting a surface of the detachable windshield.

15. The vehicle of claim 14, wherein each of the plurality of releasable fasteners comprise a pin that is inserted through a hole in a post to secure the detachable windshield between the washer and the structural member.

16. The vehicle of claim 14, wherein each of the plurality of releasable fasteners comprises a shank inserted through a hole in the detachable windshield and a hole in the structural member to secure the detachable windshield between the washer and the structural member, and wherein the shank comprises an internal release mechanism that couples to the structural member.

17. The vehicle of claim 13, further comprising a gasket located between the detachable windshield and the structural member.

18. The vehicle of claim 17 wherein at least a portion of the gasket resides within the structural member; and wherein the gasket contacts an inner surface of the detachable windshield.

19. The vehicle of claim 17 wherein the gasket contacts at least a portion of an edge of the detachable windshield.

20. The vehicle of claim 17, wherein the gasket rests in a channel formed on an inner perimeter of the structural member.

21. The vehicle of claim 13, further comprising:
   a clamp including a pivot attached to the structural member, wherein the clamp secures the detachable windshield to the structural member.

22. The vehicle of claim 1, further comprising a gasket located between the windshield and the structural member.

23. The vehicle of claim 22, wherein at least a portion of the gasket resides within the structural member and wherein the gasket contacts an inner surface of the detachable windshield.

24. The vehicle of claim 22, wherein the gasket contacts at least a portion of an edge of the windshield.

25. The vehicle of claim 22, wherein the gasket rests in a channel formed on an inner perimeter of the structural member.

26. The vehicle of claim 1, further comprising:
   a clamp including a pivot attached to the structural member, wherein the clamp secures the windshield to the structural member.

* * * * *